(12) United States Patent
Salter et al.

(10) Patent No.: US 12,162,393 B2
(45) Date of Patent: Dec. 10, 2024

(54) VEHICLE HAVING DEPLOYABLE WORKSTATION

(71) Applicant: Ford Global Technologies, LLC, Dearborn, MI (US)

(72) Inventors: Stuart C. Salter, White Lake, MI (US); Johnathan Andrew Line, Northville, MI (US); Annette Lynn Huebner, Highland, MI (US); Paul Kenneth Dellock, Northville, MI (US); David Brian Glickman, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 200 days.

(21) Appl. No.: 17/872,192

(22) Filed: Jul. 25, 2022

(65) Prior Publication Data

US 2024/0025323 A1    Jan. 25, 2024

(51) Int. Cl.
*B60N 3/00* (2006.01)
*B60N 2/02* (2006.01)

(52) U.S. Cl.
CPC ........... *B60N 3/001* (2013.01); *B60N 2/0292* (2013.01)

(58) Field of Classification Search
CPC .... B60N 3/001; B60N 2/0292; B60N 2/3047; B60N 3/002; B60R 2011/0082; B60R 2011/0085; B60R 11/0235; B60R 11/00; B60R 11/0229; B60R 2011/0019; B60R 11/02; B62D 25/14
USPC ........ 296/24.34, 70, 37.15, 24.39, 69, 65.05
See application file for complete search history.

(56) References Cited

U.S. PATENT DOCUMENTS

| | | | | |
|---|---|---|---|---|
| 2,132,279 | A * | 10/1938 | Wicknick | B60N 3/004 297/146 |
| 4,913,487 | A * | 4/1990 | Breckel | B64D 11/0691 297/14 |
| 5,106,141 | A * | 4/1992 | Mostashari | B60P 3/14 5/118 |
| 5,137,321 | A * | 8/1992 | Landry | B60P 3/14 296/24.39 |
| 7,303,226 | B2 | 12/2007 | Bernstein et al. | |
| 9,428,118 | B1 | 8/2016 | Rawlinson | |

(Continued)

FOREIGN PATENT DOCUMENTS

| | | | |
|---|---|---|---|
| CN | 205381185 U | * | 7/2016 |
| CN | 208006871 U | * | 10/2018 |

(Continued)

*Primary Examiner* — Pinel E Romain
(74) *Attorney, Agent, or Firm* — Vichit Chea; Price Heneveld LLP (57) ABSTRACT

A vehicle includes a cabin interior, at least one seat located in the cabin interior, a support structure located near the at least one seat, and a workstation coupled to the support structure. The workstation includes a desk having a first desk panel and a second desk panel that moves relative to the first desk panel, a display screen, and a pivot mechanism coupled to the desk and the display screen and configured to allow the desk and the display screen to pivot relative to the support structure, wherein the desk and the display screen are configured to pivot to a vehicle downward position folded together and upward deployed use positions such that the desk may extend substantially horizontal in the use position and the display screen may extend upward relative to the desk.

17 Claims, 7 Drawing Sheets

(56) References Cited

U.S. PATENT DOCUMENTS

| | | | | |
|---|---|---|---|---|
| 10,017,087 B2 | * | 7/2018 | Dry | B60N 3/004 |
| 10,752,132 B2 | * | 8/2020 | Fitzpatrick | B60N 2/793 |
| 11,273,747 B1 | * | 3/2022 | Kim | B60N 3/002 |
| 11,904,692 B2 | * | 2/2024 | Salter | B62D 25/14 |
| 2007/0219818 A1 | | 9/2007 | Duthler et al. | |
| 2009/0243325 A1 | * | 10/2009 | Villeminey | B60N 2/305 |
| | | | | 296/65.09 |
| 2014/0361585 A1 | * | 12/2014 | Henshaw | B60N 3/002 |
| | | | | 297/217.3 |
| 2015/0136928 A1 | * | 5/2015 | Fischer | B60R 11/0252 |
| | | | | 248/289.11 |
| 2015/0137564 A1 | * | 5/2015 | Cuddihy | B60N 2/3056 |
| | | | | 297/94 |
| 2015/0268916 A1 | * | 9/2015 | Eisenberg | H04M 1/72409 |
| | | | | 455/566 |
| 2021/0023946 A1 | | 1/2021 | Johnson et al. | |
| 2024/0109469 A1 | * | 4/2024 | Barron | B60N 3/008 |
| 2024/0157895 A1 | * | 5/2024 | Miyoshi | B60N 2/75 |

FOREIGN PATENT DOCUMENTS

| | | | | |
|---|---|---|---|---|
| DE | 102014213017 A1 | | 1/2016 | |
| GB | 2349811 A | * | 11/2000 | B60N 2/24 |
| WO | WO-9950088 A1 | * | 10/1999 | B60N 2/0292 |
| WO | WO-0137070 A2 | * | 5/2001 | B60R 11/02 |
| WO | WO-2020207482 A1 | * | 10/2020 | |

\* cited by examiner

VEHICLE HAVING DEPLOYABLE WORKSTATION

FIELD OF THE DISCLOSURE

The present disclosure generally relates to deployable workstations, and more particularly relates to a deployable workstation having a desk and a display that is deployable in a vehicle.

BACKGROUND OF THE DISCLOSURE

Motor vehicles are commonly equipped with a cabin interior having passenger seating for transporting passengers. In some situations where passengers may want a work space in the vehicle, it would be desirable to provide for a workstation that may be deployed within the cabin interior.

SUMMARY OF THE DISCLOSURE

According to a first aspect of the present disclosure, a vehicle is provided and includes a cabin interior, a first seat located in the cabin interior, a support structure located near a first seat, and a workstation coupled to the support structure. The workstation includes a desk, a display screen, and a pivot mechanism coupled to the desk and the display screen and configured to allow the desk and the display screen to pivot relative to the support structure, wherein the desk and the display screen are configured to pivot to a folded stowed position and an upward deployed use position such that the desk may extend substantially horizontal in the use position and the display screen may extend upward relative to the desk.

Embodiments of the first aspect of the present disclosure can include any one or a combination of the following features:
 the support structure comprises a support panel;
 the support panel comprises a wall of the cabin interior;
 the support panel comprises a second seat;
 the second seat comprises a seat base having a bottom side that is coupled to the workstation, wherein the workstation may be deployed when the seat base flips up to a substantially vertical position;
 the first seat comprises a rearward facing seat and the second seat comprises a vehicle-forward facing seat;
 the workstation further comprises a sunshade member coupled to the display screen, wherein the sunshade member may pivot relative to a top edge of the display screen in the use position;
 at least one support member connecting the desk to the display screen, wherein the at least one support member supports the desk at an angle of approximately 90 degrees relative to the display screen;
 the desk comprises a first desk panel and a second desk panel that moves relative to the first desk panel to extend or retract a work surface;
 the desk has a frame defining a frame structure that allows the second desk panel to slide relative to the first desk panel; and
 the workstation comprises first and second desks and first and second display screens.

According to a second aspect of the present disclosure, a vehicle is provided and includes a cabin interior, at least one rearward oriented first seat located in the cabin interior, a support panel located rearward of the first seat, wherein the support panel comprises one of a rear wall panel and a rearward seat panel, and a workstation coupled to the support panel. The workstation includes a desk having a first desk panel and a second desk panel that slides relative to the first portion between retracted and extended positions, a display screen, and a pivot mechanism coupled to the desk and the display screen and configured to allow the desk and the display screen to pivot relative to the support panel, wherein the desk and the display screen are configured to pivot to a vehicle downward position folded together and upward deployed use positions such that the desk may extend substantially horizontal in the use position and the display screen may extend upward relative to the desk.

Embodiments of the second aspect of the present disclosure can include any one or a combination of the following features:
 the desk has a frame defining a frame structure that allows the second desk panel to slide relative to the first desk panel; and
 a sunshade member coupled to the display screen, wherein the sunshade member may pivot relative to a top edge of the display screen in the use position.

According to a third aspect of the present disclosure, a workstation coupled to the support panel is provided. The workstation includes a desk having a first desk panel and a second desk panel that moves relative to the first desk panel, a display screen, and a pivot mechanism coupled to the desk and the display screen and configured to allow the desk and the display screen to pivot relative to the support panel, wherein the desk and the display screen are configured to pivot to a vehicle downward position folded together and upward deployed use positions such that the desk may extend substantially horizontal in the use position and the display screen may extend upward relative to the desk.

Embodiments of the third aspect of the present disclosure can include any one or a combination of the following features:
 a sunshade member coupled to the display screen, wherein the sunshade member may pivot relative to a top edge of the display screen in the use position;
 at least one support member connecting the desk to the display screen, wherein the at least one support member supports the desk at an angle of approximately 90 degrees relative to the display screen;
 the desk has a frame defining a track that allows the second desk panel to slide relative to the first desk panel;
 the workstation comprises first and second desks and first and second display screens; and
 a bracket configured to couple the workstation to a support structure in a vehicle.

These and other features, advantages, and objects of the present invention will be further understood and appreciated by those skilled in the art by reference to the following specification, claims, and appended drawings.

DETAILED DESCRIPTION OF PREFERRED EMBODIMENTS

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
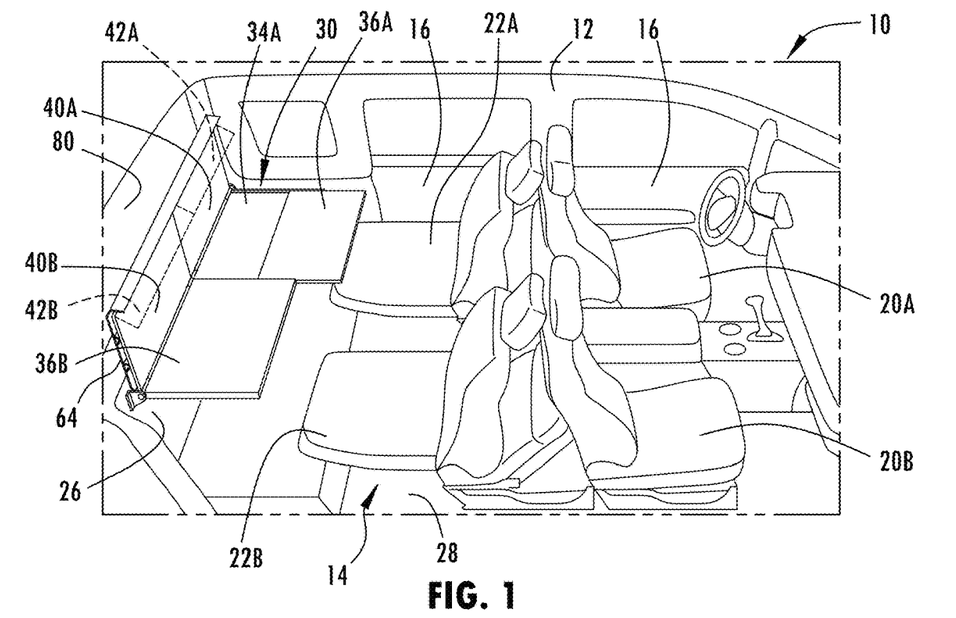
FIG. 1 is a side perspective view of a motor vehicle having a deployable workstation in a cabin interior.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a deployable workstation and a vehicle having a deployable workstation. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a wheeled automotive or motor vehicle 10 is generally illustrated configured with passenger seating and accommodations for transporting one or more passengers. The motor vehicle 10 has a vehicle body 12 that generally defines a cabin interior 14. The cabin interior 14 may contain various features and trim components within the vehicle body 12. The cabin interior 14 is shown having an arrangement of passenger seats including a front row of seating having a driver seat 20A and a passenger seat 20B.

The seating arrangement also includes a second row of seating including passenger seats 22A and 22B. The vehicle 10 may also include additional seating as is common for a typical large SUV, van or bus. It should be appreciated that the vehicle 10 may be a motor vehicle, such as a wheeled car, truck, SUV, van or bus, for example, or an airplane, train, boat or other vehicle capable of transporting one or more passengers.

The cabin interior 14 shown in FIG. 1 has a second row of seating including passenger seats 22A and 22B which are supported on the underlying floor 28 and are configurable to be oriented to face vehicle rearward in the exemplary embodiment. It should be appreciated that passenger seats 22A and 22B may be fixed in a rearward facing position and, in one example, may be reconfigurable to rotate or pivot to flip between forward and rearward facing positions. In the rearward facing position, passengers seated in passenger seats 22A and 22B will face vehicle rearwards towards a rear wall 26 of the vehicle 10, in this example. In this rearward facing position, passengers seated in passenger seats 22A and 22B may engage and use a deployable workstation 30 that is located vehicle rearward. The deployable workstation 30 is shown connected to a support structure comprising a support panel that forms the rear wall 26 of vehicle 10, in this example.

In the embodiment shown, the workstation 30 includes a first desk 32A and a second desk 32B. The first desk 32A is connected to a pivot mechanism 44 which is also connected to a first display screen 40A. The second desk 32B likewise is connected to the pivot mechanism 44 which is also connected to a second display screen 40B. The first desk 32A and first display screen 40A are configured side-by-side with the second desk 32B and the second display screen 40B. The first desk 32A and first display screen 40A may rotate independently about a vehicle transverse pivot axis defined by the pivot mechanism 44 between stowed and use positions. Similarly, the second desk 32B and the second display screen 40B may rotate independently about the vehicle transverse pivot axis defined by the pivot mechanism 44 between stowed and deployed use positions. Thus, the first and second desks 32A and 32B and the first display screen 40A and second display screen 40B are independently deployable. It should be appreciated that the deployable workstation 30 may include any number of one or more desks and display screens, according to other embodiments.

Figure 2:
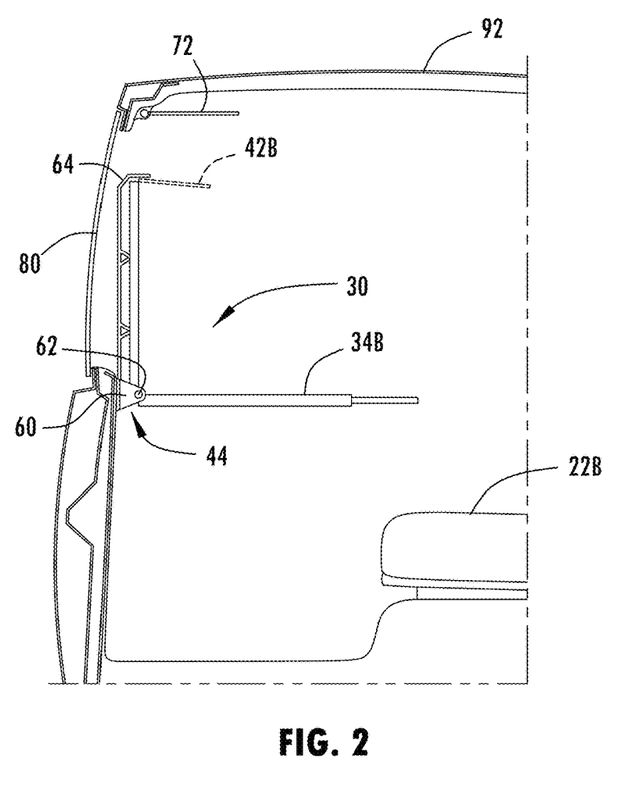
FIG. 2 is a side view of the rear portion of the cabin interior further illustrating the deployable workstation support on a rear wall of the cabin interior, according to one example.

In the example shown in FIGS. 1 and 2, the deployable workstation 30 is fixedly connected to the rear wall 26 of the cabin interior 14 which may be a support panel that serves as the support structure via a pair of brackets 60. The rear wall 26 may include a body panel or trim component of the vehicle 10. In some examples, the rear wall 26 may by part of a door, such as a liftgate or tailgate that may be moved to an open door position to expose the rear end of the cabin interior 14. The deployable workstation 30 may be connected onto a track that allows the workstation 30 to adjust in height.

Figure 3A:
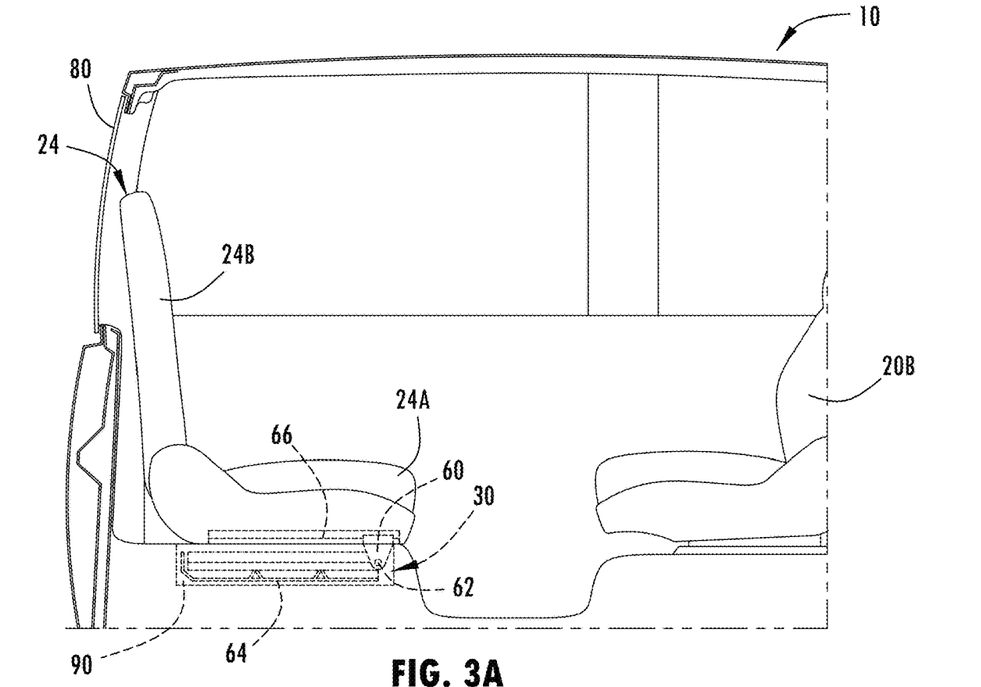
FIG. 3A is a side view of the rear portion of the cabin interior illustrating the deployable workstation stowed on the underside of a flip-up seat, according to another example.
Figure 3B:
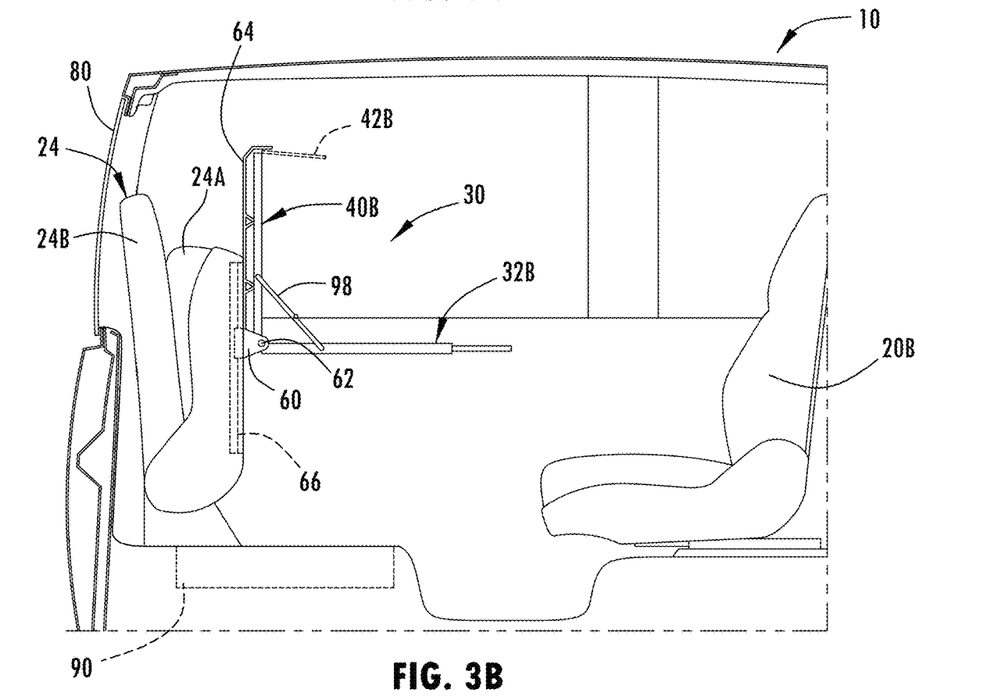
FIG. 3B is a side view of the rear portion of the cabin interior further illustrating the deployable workstation of FIG. 3A in a deployed position.

Referring to FIGS. 3A and 3B, the deployable workstation 30 is shown in another example supported by a support structure on the bottom side of a flip-up seat 24 when the seat 24 is in the normal seating position as shown in FIG. 3A. The seat 24 has a seat base 24A operatively coupled to a seatback 24B. The seat 24 may be a bench seat, a split seat or other plurality of seats that may be a forward facing third row or further row of seating. The seat base 24A may pivot from a substantially horizontal use position upward approximately 90° to a substantially vertical stowed position as shown in FIG. 3B. At least one support member 98 is shown connecting the desk 32B to the display screen 40B to support the desk 32B relative to the display screen 40B at a use position oriented at an angle of about 90°. Two support members 98, one on each side of each pair of desk and display screen, may be used and may include a pivot bar, a telescoping bar, a cable or other support. In the flipped up stowed position of the seat base 24A, the deployable workstation 30 is exposed on a vehicle-forward side and may be deployed such that the first and second display screens 40A and 40B may pivot upwards to a substantially vertical deployed position and the first and second desk 32A and 32B may pivot outwards to a substantially horizontal deployed position presented vehicle rearward of and in front of the passenger seats 22A and 22B.

As illustrated in FIG. 3B, the deployable workstation 30 is connected via a pair of brackets 60 on opposite ends onto the bottom side of the seat base 24A to support the deployable workstation 30. The pair of brackets 60 may slide within a track 66 to adjust for vertical positioning and thus height to raise and lower the workstation 30, particularly during use in the deployed position. The deployable workstation 30 further has a protective trim cover 64 on the back side of each of the display screens 40A and 40B. The protective trim cover 64, in the stowed position, is vertical forward on the rear wall supported embodiment and is facing downward on the flip chair embodiment and protects the deployable workstation 30.

Figure 4:
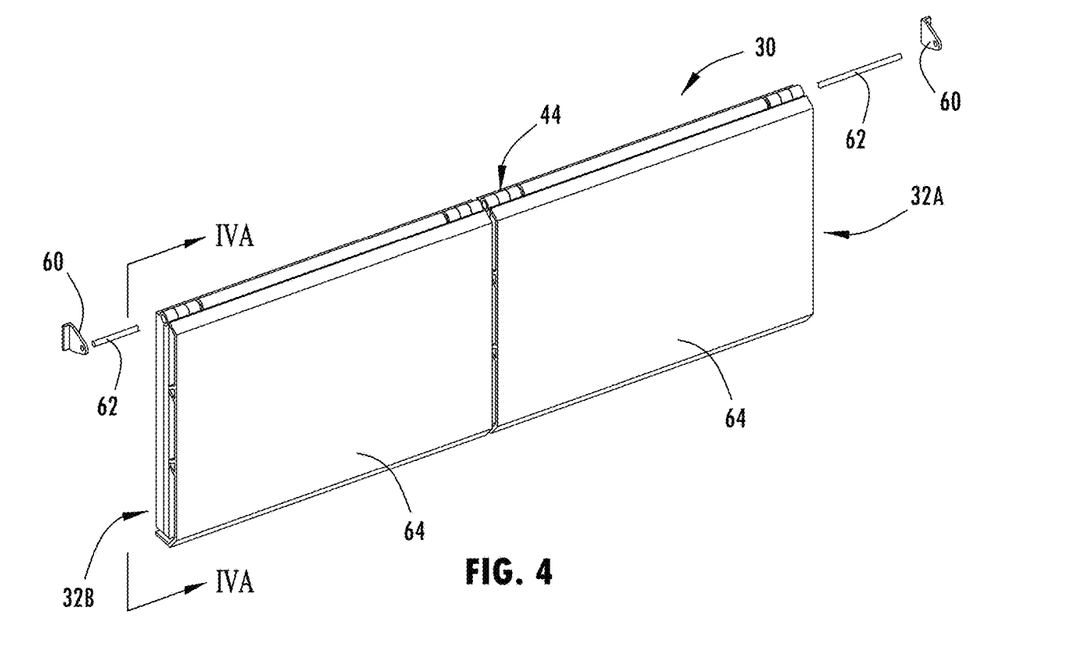
FIG. 4 is an enlarged perspective view of the deployable workstation shown in a stowed position.
Figure 4A:
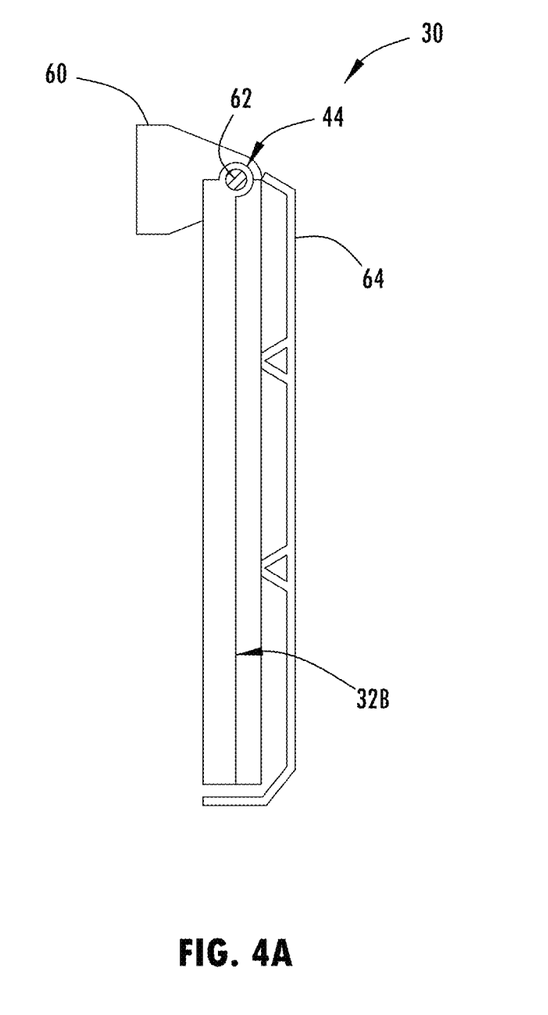
FIG. 4A is a cross-sectional view taken through line IVA-IVA of FIG. 4 further illustrating the deployable workstation in the stowed position.

Referring to FIGS. 4 and 4A, the deployable workstation 30 is illustrated oriented in a substantially vertical stowed position. The pivot mechanism 44 is shown receiving a cylindrical rod 62 which, in turn, is connected to the pair of brackets 60 on opposite ends and allows the pivot mechanism 44 to rotate or pivot about the transverse axis. The brackets 60 may be connected to a rear panel forming the support structure, such as the rear wall 26 or the underside of the flip-up seat 24.

Figure 5:
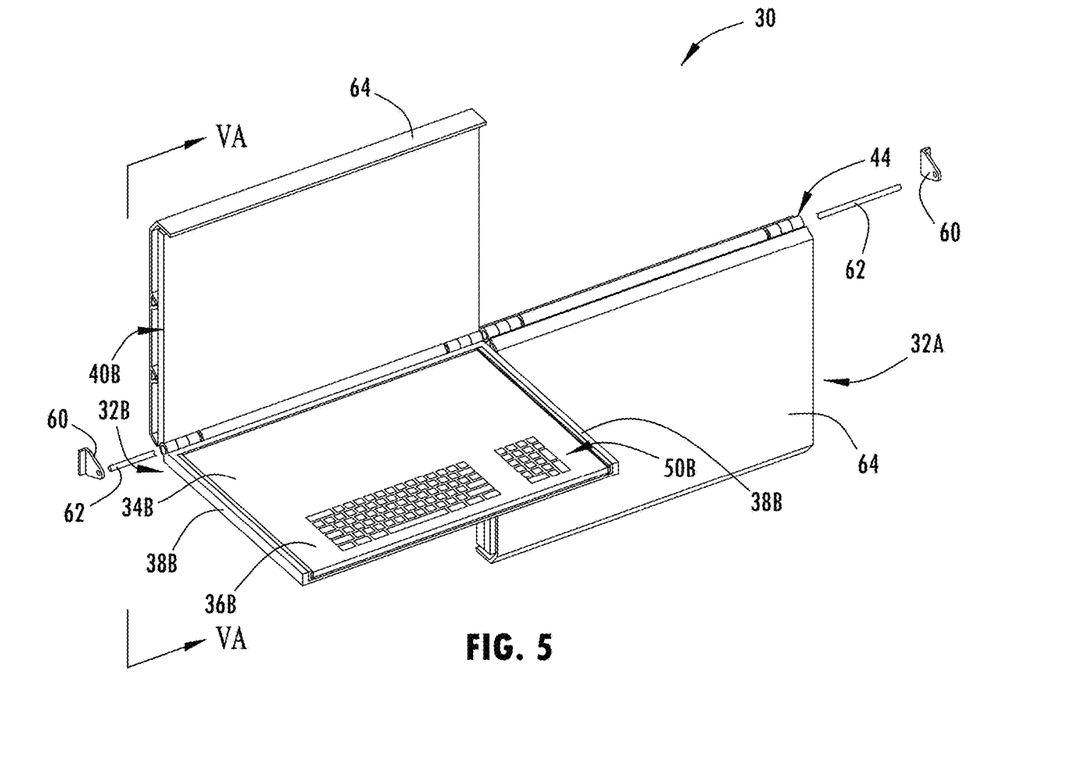
FIG. 5 is a perspective view of the deployable workstation shown in a partially deployed position.
Figure 5A:
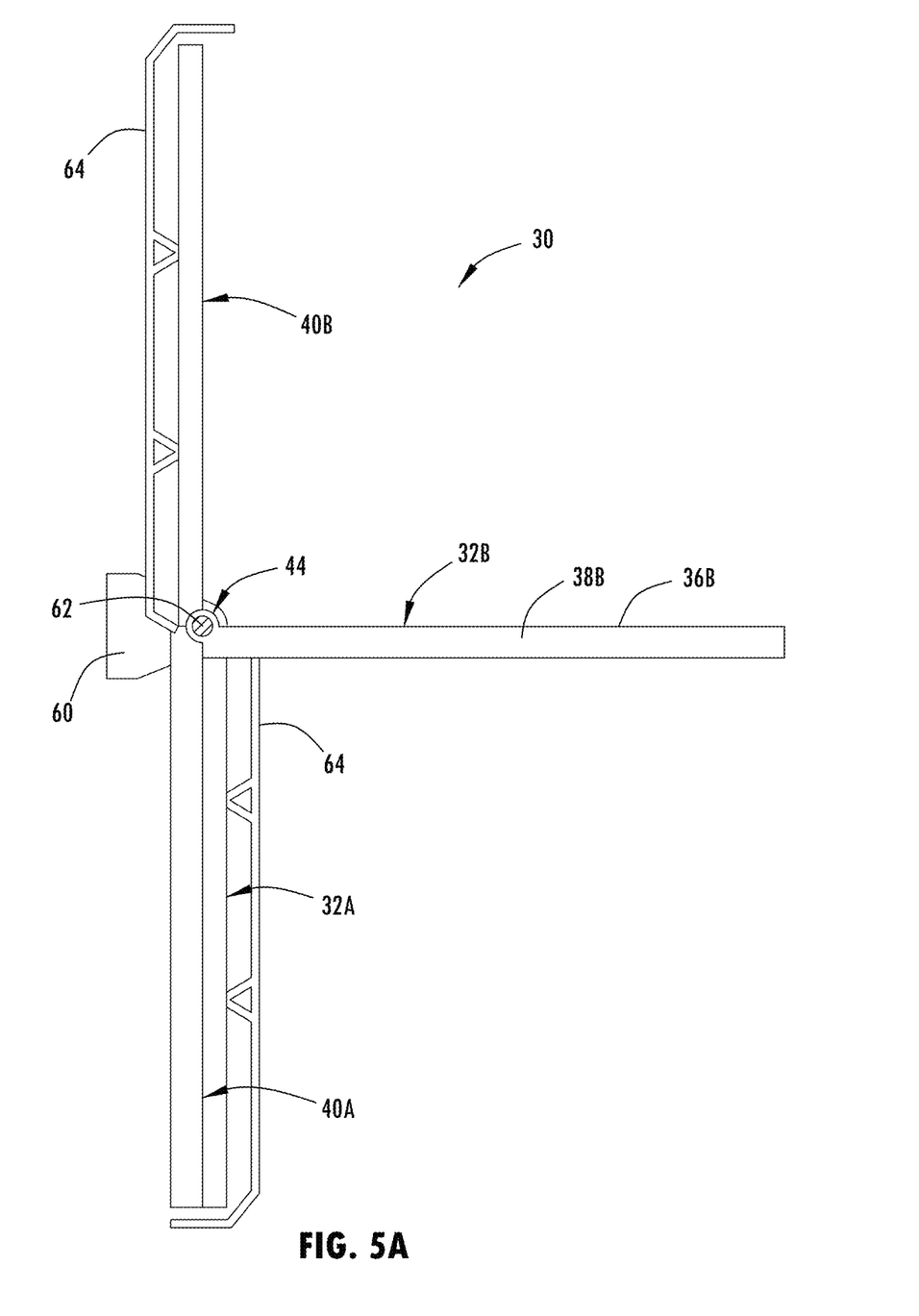
FIG. 5A is a cross-sectional view taken through line VA-VA of FIG. 5 illustrating the deployable workstation in the partially deployed position.
Figure 6:
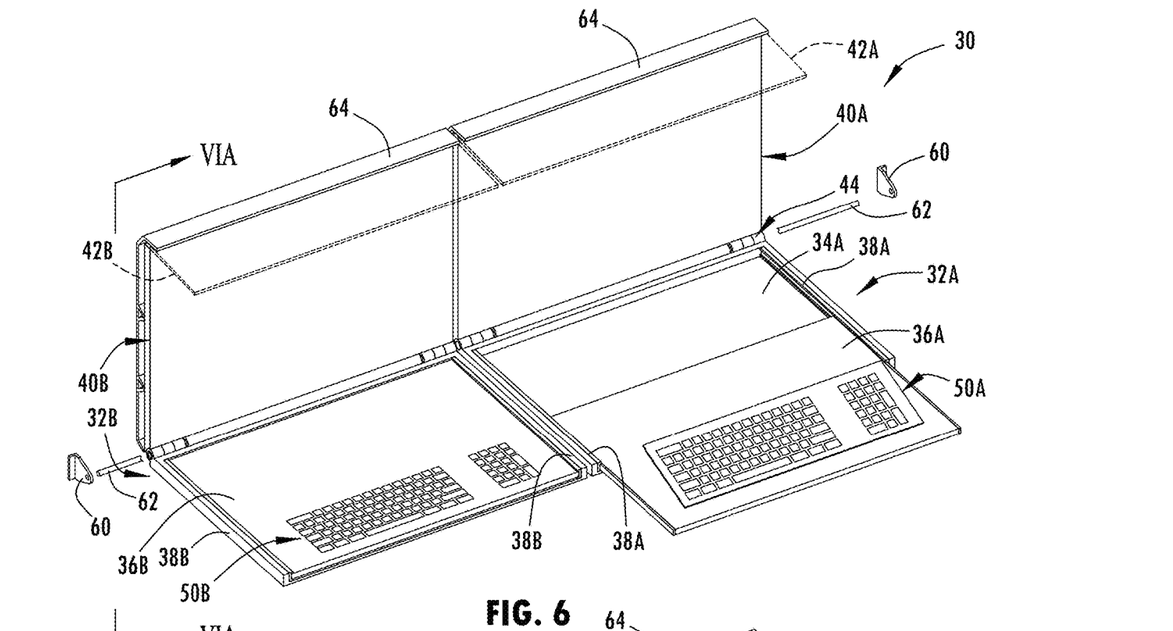
FIG. 6 is a perspective view of the workstation further illustrated in yet a further deployed position.
Figure 7:
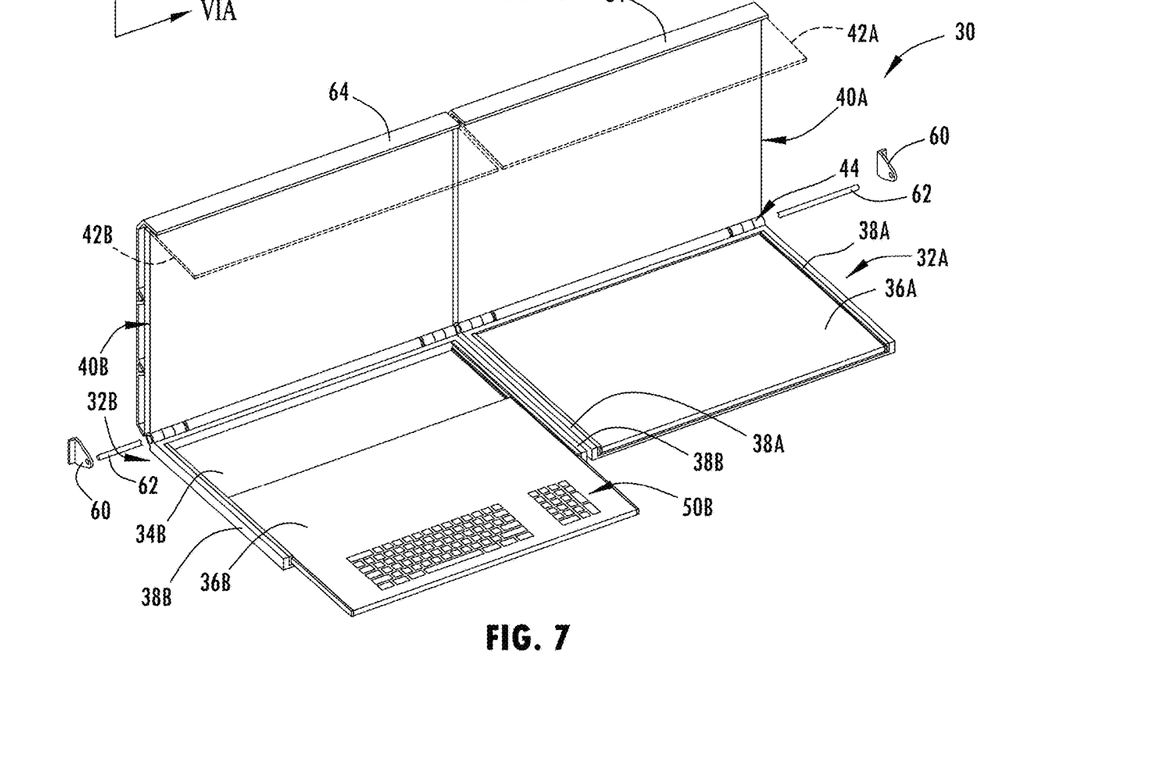
FIG. 7 is a perspective view of the workstation illustrated in yet another deployed position.

The deployable workstation 30 may be moved from the stowed position shown in FIGS. 4 and 4A to any of a number of deployed use positions as shown in FIGS. 5-7. As seen in FIGS. 5 and 5A, one of the first and second desks 32A and 32B and display screens 40A and 40B may be deployed while the other desk and display screen remains stowed. In this example, the second desk 32B and second display screen 40B are shown in the deployed use position with the second desk 32B extending substantially horizontal and the second display screen 40B extending substantially vertical. This deployed position may accommodate a user, e.g., passenger, seated in seat 22B to utilize the second desk 32B and the second display screen 40B.

Figure 6A:
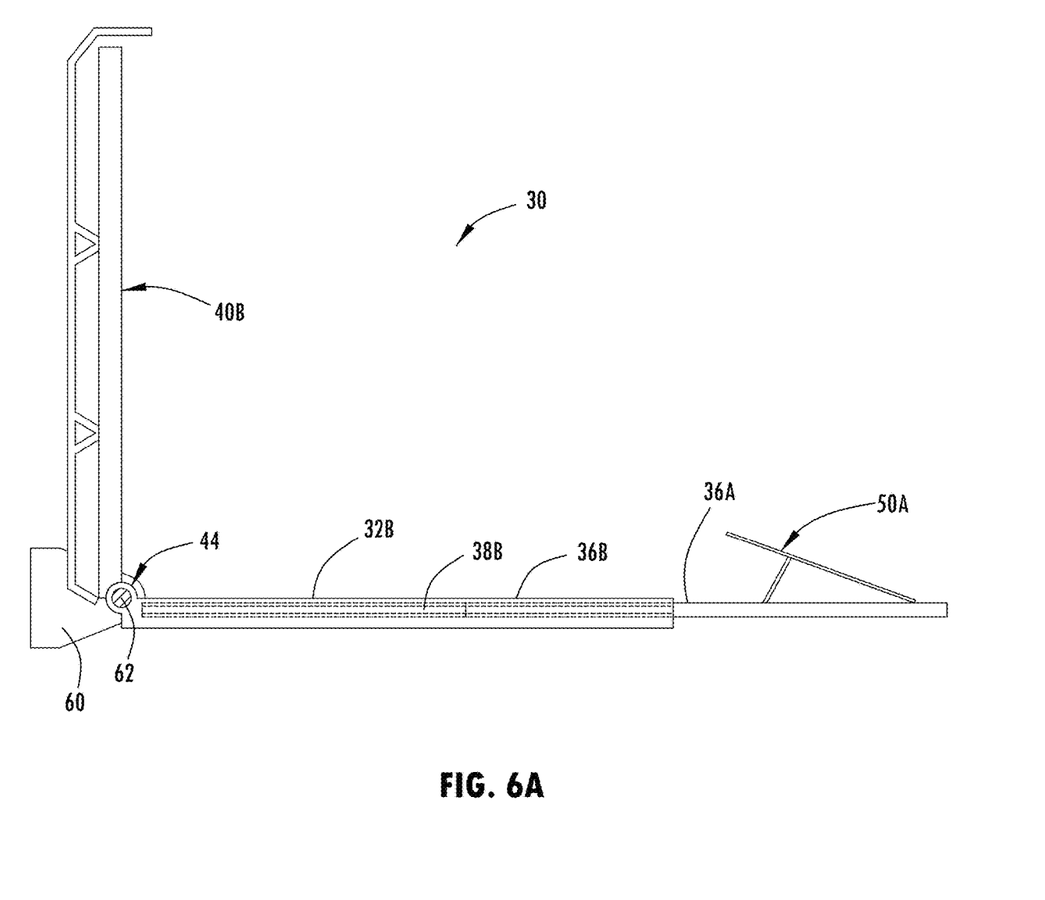
FIG. 6A is a cross-sectional view taken through line VI-VI of FIG. 6 further illustrating the deployable workstation in the deployed position.

As seen in FIGS. 6 and 6A, the first desk 32A may be deployed to pivot outwards to a substantially horizontal position and the first display screen 40A may be deployed to pivot upward and extending substantially vertical. The first desk 32A has first and second desk panels 34A and 36A operatively coupled to a frame 38A which may form a track. The first desk 32A may be moved vehicle-forward by sliding desk panel 36B outward and away from desk panel 32B within the frame 38A to extend the size of the desk work surface. In this position, the first desk 32A and the first display screen 40A may be presented at an optimal position for a user seated in seat 22A. The second desk 32B likewise has first and second desk panels 34B and 36B operatively coupled to a frame 38B which may form a track. The second desk panel 36B may slide outwards relative to first desk panel 34B to extend the size of the work surface. The second desk 32B may be configured to an extended size work surface as shown in FIG. 7. Either or both first and second desks 32A or 32B may be extended out or retracted to adjust the work surface to a desired size and position for use by a seated passenger.

The first and second desks 32A and 32B may each include a keyboard or keypads 50A and 50B to allow a user to enter user inputs. According to one example, the keypads 50A or 50B may be capacitive sensors that are configured to provide user inputs for an alphanumeric keypad. According to other examples, the keypads 50A and 50B may be mechanical pushbutton inputs. The keypads 50A and 50B may electronically communicate data with the first and second display screens 40A and 40B. The keypads 50A and 50B may tilt to an angled position as seen in FIGS. 6 and 6A.

The first and second display screens 40A and 40B are further shown in FIGS. 6 and 7 having an extension members 42A or 42B extending from the top side thereof that serve as sun visors. The extension members 42A and 42B may extend forward of the respective first and second display screens 40A and 40B to operate as a sunshield, according to one example. The extension members 42A and 42B may pivot about a hinge proximate a top edge of the respective display screens 40A and 40B. In addition, the extension members 42A and 42B may include a connector, such as a latch, that is configured to connect with a connector, such as a latch pin, on the outer edge of the respective desks 32A and 32B to connect the desks 32A and 32B to the respective display screens 40A and 40B in the stowed position.

Additional extension member 72 as seen in FIG. 2 may be provided on the vehicle to further shade the sunlight. The extension members 42A and 42B and 72 may be opaque or may be electrochromic to enhance the user of the display screens 40A and 40B.

Accordingly, the deployable workstation 30 advantageously provides for a desk and display screen that may be stowed when not in use and deployed together for use when needed in a vehicle 10. The deployable workstation 30 may be used when the vehicle 10 is parked and not moving or may be used in a moving vehicle in some circumstances. It is anticipated that technology and the regulatory framework may evolve in the future to where using the workstation 30 in a moving vehicle becomes safe and permissible.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
a cabin interior;
a first seat located in the cabin interior;
a support structure located near a first seat; and
a workstation coupled to the support structure, the workstation comprising:
a desk;
a display screen configured to communicate data with a keyboard or keypad;
a pivot mechanism coupled to the desk and the display screen and configured to allow the desk and the display screen to pivot relative to the support structure, wherein the desk and the display screen are configured to pivot to a folded stowed position and an upward deployed use position such that the desk may extend substantially horizontal in the use position and the display screen may extend upward relative to the desk; and
a sunshade member coupled to the display screen, wherein the sunshade member may pivot relative to a top edge of the display screen in the use position.

2. The vehicle of claim 1, wherein the support structure comprises a support panel.

3. The vehicle of claim 2, wherein the support panel comprises a wall of the cabin interior.

4. The vehicle of claim 2, wherein the support panel comprises a second seat.

5. The vehicle of claim 4, wherein the second seat comprises a seat base having a bottom side that is coupled to the workstation, wherein the workstation may be deployed when the seat base flips up to a substantially vertical position.

6. The vehicle of claim 5, wherein the first seat comprises a rearward facing seat and the second seat comprises a vehicle-forward facing seat.

7. The vehicle of claim 1 further comprising at least one support member connecting the desk to the display screen, wherein the at least one support member supports the desk at an angle of approximately 90 degrees relative to the display screen.

8. The vehicle of claim 1, wherein the desk comprises a first desk panel and a second desk panel that moves relative to the first desk panel to extend or retract a work surface.

9. The vehicle of claim 8, wherein the desk has a frame defining a frame structure that allows the second desk panel to slide relative to the first desk panel.

10. The vehicle of claim 1, wherein the workstation comprises first and second desks and first and second display screens.

11. A vehicle comprising:
a cabin interior;
at least one rearward oriented first seat located in the cabin interior;
a support panel located rearward of the first seat, wherein the support panel comprises one of a rear wall panel and a rearward seat panel; and
a workstation coupled to the support panel, the workstation comprising:
a desk having a first desk panel and a second desk panel that slides relative to a first portion between retracted and extended positions;
a display screen; and
a pivot mechanism coupled to the desk and the display screen and configured to allow the desk and the display screen to pivot relative to the support panel, wherein the desk and the display screen are configured to pivot to a vehicle downward position folded together and an upward deployed use position such that the desk may extend substantially horizontal in the use position and the display screen may extend upward relative to the desk.

12. The vehicle of claim 11, wherein the desk has a frame defining a frame structure that allows the second desk panel to slide relative to the first desk panel.

13. The vehicle of claim 11, wherein the workstation further comprises a sunshade member coupled to the display screen, wherein the sunshade member may pivot relative to a top edge of the display screen in the use position.

14. A workstation coupled to a support panel, the workstation comprising:
a desk having a first desk panel and a second desk panel that moves relative to the first desk panel;
a display screen configured to communicate data with a keyboard or keypad;

a pivot mechanism coupled to the desk and the display screen and configured to allow the desk and the display screen to pivot relative to the support panel, wherein the desk and the display screen are configured to pivot to a vehicle downward position folded together and an upward deployed use position such that the desk may extend substantially horizontal in the use position and the display screen may extend upward relative to the desk;

a sunshade member coupled to the display screen, wherein the sunshade member may pivot relative to a top edge of the display screen in the use position; and wherein the desk includes first and second desks and the display screen includes first and second display screens.

15. The workstation of claim 14 further comprising at least one support member connecting the desk to the display screen, wherein the at least one support member supports the desk at an angle of approximately 90 degrees relative to the display screen.

16. The workstation of claim 14, wherein the desk has a frame defining a track that allows the second desk panel to slide relative to the first desk panel.

17. The workstation of claim 14 further comprising a bracket configured to couple the workstation to a support structure in a vehicle.

\* \* \* \* \*